United States Patent
Hennemann et al.

(10) Patent No.: US 7,745,003 B2
(45) Date of Patent: Jun. 29, 2010

(54) PARTICLES HAVING A FUNCTIONAL MULTILAYERED STRUCTURE

(75) Inventors: Alfred Hennemann, Brombachtal (DE);
Marc Entenmann, Fellbach (DE);
Margarete Müller, Münster (DE);
Renate Bonn-Walter, Darmstadt (DE);
Adalbert Huber, Bensheim (DE);
Ulrich Schoenefeld, Bickenbach (DE)

(73) Assignee: Merck Patent GmbH, Darmstadt (DE)

( * ) Notice: Subject to any disclaimer, the term of this patent is extended or adjusted under 35 U.S.C. 154(b) by 834 days.

(21) Appl. No.: 10/588,459

(22) PCT Filed: Jan. 15, 2005

(86) PCT No.: PCT/EP2005/000370

§ 371 (c)(1),
(2), (4) Date: Aug. 4, 2006

(87) PCT Pub. No.: WO2005/075578

PCT Pub. Date: Aug. 18, 2005

(65) Prior Publication Data

US 2007/0166544 A1    Jul. 19, 2007

(30) Foreign Application Priority Data

Feb. 7, 2004    (DE)    ........... 10 2004 006 145

(51) Int. Cl.
*B32B 5/16* (2006.01)
*B32B 9/00* (2006.01)
*B32B 15/02* (2006.01)
*B32B 17/02* (2006.01)
*B32B 19/00* (2006.01)
*B32B 21/02* (2006.01)
*B32B 23/02* (2006.01)
*B32B 27/02* (2006.01)
*C09D 11/00* (2006.01)
*C09C 1/00* (2006.01)
*C08K 5/00* (2006.01)

(52) U.S. Cl. .......... 428/405; 428/4.3; 428/404; 106/31.6; 106/31.69; 106/416; 106/418; 106/499; 427/212

(58) Field of Classification Search ........... 106/416, 106/418, 499, 31.6, 31.69; 428/403–405; 427/212

See application file for complete search history.

(56) References Cited

U.S. PATENT DOCUMENTS

| 4,143,027 | A | * | 3/1979 | Sollman et al. | 524/571 |
| 5,912,283 | A | * | 6/1999 | Hashizume et al. | 523/213 |
| 6,030,442 | A | * | 2/2000 | Kabra et al. | 106/162.8 |
| 6,533,858 | B1 | * | 3/2003 | Cacace et al. | 106/416 |
| 6,686,046 | B2 | * | 2/2004 | Schauer et al. | 428/403 |
| 2001/0056135 | A1 | | 12/2001 | Kieser | |
| 2003/0012954 | A1 | | 1/2003 | Schauer | |

FOREIGN PATENT DOCUMENTS

| CA | 2024486 A1 | 3/1991 |
| EP | 0416395 A | 3/1991 |
| EP | 0634459 A | 1/1995 |
| WO | WO0160926 A | 8/2001 |
| WO | WO0231059 A | 4/2002 |
| WO | WO2005056696 A | 6/2005 |

* cited by examiner

*Primary Examiner*—Anthony J Green
*Assistant Examiner*—Pegah Parvini
(74) *Attorney, Agent, or Firm*—Millen, White, Zelano, Branigan, P.C.

(57) ABSTRACT

The present invention relates to particles having a functional multilayered structure based on substrates, characterized in that the substrates are coated with one or more layers of one or more polymers and one or more layers of one or more silanes, process for the production thereof, and the use thereof.

11 Claims, No Drawings

PARTICLES HAVING A FUNCTIONAL MULTILAYERED STRUCTURE

The present invention relates to particles having a functional multilayered structure based on substrates, characterised in that the substrates are coated with one or more layers of one or more polymers and one or more layers of one or more silanes, to a process for the production thereof, and to the use thereof.

In a series of technical systems and materials, use is increasingly being made of particulate materials which are able to take on a wide variety of tasks in these systems. Thus, they are employed, for example, for corrosion protection, as barrier, for mechanical reinforcement, but also for colouring. The particulate materials are employed here in a multiplicity of different application media, such as, for example, paints, coatings and plastics, where quite individual requirements are made of the particulate materials. Primarily, the materials should be highly compatible with the application medium surrounding them, but must also be sufficiently stable for in some cases long periods. Thus, for example, flake-form effect pigments based on flake-form substrates are widely used for colouring, and this in a whole series of application media which differ greatly in composition. A fundamental problem here is the tendency of flake-form effect pigments to form agglomerates, in which the pigments lie one on top of the other in the form of a stack and can only be separated again with difficulty owing to the strong adhesion. This is all the more serious as high shear forces must not be exerted during incorporation of flake-form effect pigments into application media owing to the fragility of the thin flakes. Compatibility of particulate materials with the application media is problematic here not only in the case of flake-form materials, but also in the case of any particulate materials.

In order to circumvent these problems, it has been proposed a number of times to subject the particulate materials to aftertreatment with the aim of improving the applicational properties of these materials. The aftertreatment frequently involves coating the particulate materials with silanes or polymers. Thus, WO 99/51690 describes pigments having improved dispersion properties, where a pigment, for example graphite, is coated with polyamides, polycarbonates, polyethers, etc., and the use of these surface-modified pigments in inks, toners and plastics.

EP 0 703 192 describes crosslinked resin-coated $SiO_2$ particles having a size of from 0.6 to 17 μm which are coated with a vinyl-containing silane in order to subsequently polymerise a vinyl monomer thereto by free-radical polymerisation to give a polymer. Particles coated in this way serve as means for controlling the thickness of a liquid-crystal layer in an LCD display. The coating thus serves the sole purpose of ensuring a spacer function of the particles, i.e. dispersal of these particles in the liquid-crystal medium is not desired in any case. These particles are therefore unsuitable for use in paints, coatings or plastics since they do not have adequate dispersibility in these media.

The methods described for the surface modification of particles, for example precipitation polymerisation of a monomeric compound in the presence of the particles to be coated or polymerisation of a monomer onto a functionalised surface, so-called grafting-from methods (see EP 0 703 192), frequently fail due to inadequate bonding of the coating material to a pre-modified, for example silane-coated surface, due to the requisite complex functionalisation of the surface or due to the specific requirements during performance of the reaction, such as, for example, the polymerisation under a protective-gas atmosphere. The layer sequence is furthermore frequently not freely selectable, i.e. the layer sequence cannot be matched to the requirements, but instead must be matched to the process parameters.

The important step here is frequently not the silane modification, but instead the coating of the surface with polymers.

The object was therefore to modify particulate materials in such a way that they can be dispersed in a multiplicity of different media and applications or their applicational properties can be matched individually to the application medium. In addition, the modified particles should be stable in the application media and, in particular in the case of pigments, result in uniform colouring without affecting the essential colour properties or the lustre. Furthermore, additional stabilisation of the particulate materials, in particular in the case of flake-form materials, is desired in order to enable them also to be used without problems in applications with high mechanical or thermal stress.

It has been found that particles having a multilayered structure in accordance with the present invention satisfy this complex requirement profile and thus also extend the range of applications of particulate materials in mechanically or thermally demanding or difficult-to-apply applications.

The present invention accordingly relates to particles having a multilayered structure based on substrates, where the substrates are coated with one or more layers of one or more polymers and one or more layers of one or more silanes. The present invention furthermore relates to a process for the preparation of these pigments and to the use thereof in surface coatings, water-borne coatings, powder coatings, paints, printing inks, safety elements, plastics, concrete, in cosmetic formulations, in agricultural sheeting and tent awnings and for the preparation of pigment compositions and dry preparations.

The particles according to the invention having a multilayered structure have the advantage that they can be matched individually to the application medium with respect to their applicational properties. The layers of one or more silanes exert a barrier function, while the one or more polymer layers stabilise the particles against agglomeration, but also against mechanical influences. Depending on the choice of polymers, the compatibility of the particles with a matrix likewise consisting of polymers, for example with a binder matrix, is significantly increased. The multilayered structure proves to be stable here, i.e. detachment of the applied layers of silanes and polymers does not occur. It is advantageous here that chemical bonding of the silanes to the polymers, as is the case in the prior art, is unnecessary, i.e. the silane and the polymer do not have to be matched to one another with respect to their structure and reactivity. This increases the variability with respect to the desired properties of the particles and allows the ideal combination of the properties of the silanes employed with those of the polymers employed. If the polymer layers are not formed by graft polymerisation, but instead, as in the present invention, preferably by precipitation of polymers, a complex protective-gas atmosphere can also be omitted. Furthermore, the particles are additionally exposed to fewer foreign substances by the process. The products obtained are thus formed directly in purer form during production, enabling an interfering monomer content or complex purification to be avoided here.

The particles according to the invention having a multilayered structure are based on substrates, which can in principle have any shape; they are preferably in flake form. Flake-form particles in particular are subjected to mechanical shear forces during incorporation in applications. The layer structure according to the invention comprising silanes and polymers enables these particles to be additionally stabilised, which enables them to be used in mechanically demanding applications.

Suitable substrates are $SiO_2$ particles, $TiO_2$ particles, effect pigments, holographic pigments, pearlescent pigments, interference pigments, multilayered pigments, metal-effect pigments and/or BiOCl pigments, the substrates are preferably effect pigments, pearlescent pigments, interference pigments, multilayered pigments or metal-effect pigments.

Effect pigments, pearlescent pigments, interference pigments, metal-effect pigments or multilayered pigments which can be employed in accordance with the present invention are based, in particular, on supports, which is preferably in flake form. Suitable supports are, for example, flake-form $TiO_2$, synthetic or natural mica, glass flakes, metal flakes, flake-form $SiO_2$, $Al_2O_3$ or flake-form iron oxide. The metal flakes can consist, inter alia, of aluminium, titanium, bronze, steel or silver, preferably aluminium and/or titanium. The metal flakes may have been passivated by appropriate treatment. In a preferred embodiment, the support is coated with one or more transparent, semitransparent and/or opaque layers comprising metal oxides, metal oxide hydrates, metal suboxides, metals, metal fluorides, metal nitrides, metal oxynitrides or mixtures of these materials. The metal oxide, metal oxide hydrate, metal suboxide, metal, metal fluoride, metal nitride or metal oxynitride layers or the mixtures thereof can have low refractive indexes (refractive index<1.8) or high refractive indexes (refractive index≧1.8). Suitable metal oxides and metal oxide hydrates are all metal oxides and metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, ilmenite or pseudobrookite. Metal suboxides which can be employed are, for example, titanium suboxides. Suitable metals are, for example, chromium, aluminium, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum.

Preference is given to the application of metal oxide, metal, metal fluoride and/or metal oxide hydrate layers and very particularly preferably metal oxide and/or metal oxide hydrate layers to the support. Furthermore, multilayered structures comprising high- and low-refractive-index metal oxide, metal oxide hydrate, metal or metal fluoride layers may also be present, preferably with high- and low-refractive-index layers alternating. Particular preference is given to layer packages comprising a high-refractive-index layer and a low-refractive-index layer, it being possible for one or more of these layer packages to be applied to the support. The sequence of the high- and low-refractive-index layers can be matched to the support here in order to include the support in the multilayered structure. In a further embodiment, the metal oxide, metal oxide hydrate, metal suboxide, metal, metal fluoride, metal nitride or metal oxynitride layers can be mixed or doped with colorants or other elements. Suitable colorants or other elements are, for example, organic or inorganic coloured pigments, such as coloured metal oxides, for example magnetite or chromium oxide, or coloured pigments, such as, for example, Berlin Blue, ultramarine, bismuth vanadate, Thénard's Blue, or alternatively organic coloured pigments, such as, for example, indigo, azo pigments, phthalocyanines or alternatively Carmine Red, or elements, such as, for example, yttrium or antimony. Effect pigments comprising these layers exhibit a wide variety of colours with respect to their mass tone and can in many cases exhibit an angle-dependent change in the colour (colour flop) due to interference.

In a preferred embodiment, the outer layer on the support is a high-refractive-index metal oxide. This outer layer may additionally be on the above-mentioned layer packages or may be part of a layer package in high-refractive-index supports and can, for example, consist of $TiO_2$, titanium suboxides, $Fe_2O_3$, $SnO_2$, ZnO, $ZrO_2$, $Ce_2O_3$, CoO, $Co_3O_4$, $V_2O_5$, $Cr_2O_3$ and/or mixtures thereof, such as, for example, ilmenite or pseudobrookite. $TiO_2$ is particularly preferred.

Examples and embodiments of the above-mentioned materials and pigment structures are also given, for example, in Research Disclosures RD 471001 and RD 472005, the disclosure content of which is incorporated herein by way of reference.

The thickness of the metal oxide, metal oxide hydrate, metal suboxide, metal, metal fluoride, metal nitride or metal oxynitride layers or a mixture thereof is usually from 3 to 300 nm and in the case of the metal oxide, metal oxide hydrate, metal suboxide, metal fluoride, metal nitride or metal oxynitride layers or a mixture thereof is preferably from 20 to 200 nm. The thickness of the metal layers is preferably from 4 to 50 nm.

The size of the supports and thus of the effect pigments is not crucial per se. Flake-form supports and/or flake-form supports coated with one or more transparent, semitransparent and/or opaque layers generally have a thickness of between 0.05 and 5 μm, in particular between 0.1 and 4.5 μm. The dimension in the length or width is usually between 1 and 250 μm, preferably between 2 and 200 μm and in particular between 2 and 100 μm.

One or more layers of one or more polymers and one or more layers of one or more silanes are applied to the substrates described above. The one or more layers of silanes and polymers are preferably in the form of alternating layers of silanes and polymers, i.e. the layers of silanes and polymers alternate. If firstly a layer of one or more silanes is applied to the substrate, a layer of one or more polymers is preferably applied subsequently, and vice versa. This alternating structure can be present a number of times one after the other, where either an odd or an even number of layers can be present, for example two, three, four, five or six layers or a multiple thereof. The sequence here can be matched as desired to the requirements. Preference is given to a structure in which the substrate is coated with a layer of one or more polymers and a layer of one or more silanes applied thereto, or the substrate is coated with a layer of one or more silanes and a layer of one or more polymers applied thereto. Overall, it is thus preferred for precisely one layer of one or more silanes and one layer of one or more polymers to be applied to the substrate.

The one or more polymers can be selected from the group consisting of polyethers, polyacrylates, polyvinylcaprolactams, cellulose, polystyrenes, polyvinyl alcohols, polyvinyl acetates, polysiloxanes, derivatives of the said polymers or mixtures thereof. The polymers are preferably LCST and/or UCST polymers or polymers containing solvolysable groups. LCST polymers or UCST polymers are polymers which are soluble in a solvent at low or high temperatures respectively and are separated out of the solution as a separate phase on increasing or reducing the temperature respectively and reaching the so-called LCST or UCST (lower or upper critical solution temperature) respectively. Polymers of this type are described, for example, in the literature in "Polymere", H. G.

Elias, Hüthig und Wepf-Verlag, Zug, 1996, on pages 183 ff. In the case of polymers containing solvolysable groups, the latter are cleaved off during the solvolysis, with the polymer precipitating on the substrate.

Suitable LCST polymers for the present invention are, for example, those as described in WO 01/60926 and WO 03/014229. Particularly suitable LCST polymers are polyalkylene oxide derivatives, preferably polyethylene oxide (PEO) derivatives, polypropylene oxide (PPO) derivatives, olefinically modified PPO-PEO block copolymers, acrylate-modified PEO-PPO-PEO three-block copolymers, and polymers or derivatives thereof from the class consisting of polymethyl vinyl ether, poly-N-vinylcaprolactams, ethyl-(hydroxyethyl)celluloses, poly(N-isopropylacrylamide) and polysiloxanes. Particularly preferred LCST polymers are polyethers or siloxane polymers which have been modified by means of olefinic or silanolic groups.

Suitable UCST polymers are, in particular, polystyrene, polystyrene copolymers and polyethylene oxide copolymers.

Preference is given to the use of LCST or UCST polymers containing solvolysable or functional groups which are able to undergo strong interactions with and/or form chemical bonds to the substrate or the application medium, such as, for example, the surface-coating matrix. All functional groups known to the person skilled in the art are suitable, in particular silanol, amino, hydroxyl, olefin, hydroxyl, epoxide, acid anhydride and acid groups.

The LCST and UCST polymers preferably have molecular weights in the range from 300 to 500,000 g/mol, in particular from 500 to 20,000 g/mol.

The one or more polymer layers may additionally also comprise additives which additionally increase or reduce the chemical and/or mechanical stability of the particles, or provide the particles with UV-filtering properties or a colouring action. Suitable additives are, for example, nanoparticles of all types, plasticisers, antioxidants, free-radical scavengers, UV filters, dyes, microtitanium or mixtures thereof. The additives are preferably admixed with the solution of the polymer in the form of a dispersion, preferably using the same solvent as that of the polymer solution. The inclusion of foreign substances, such as, for example, nanoparticles, plasticisers or dyes, enables the properties of the particles to be matched to the individual requirements of the user, or it is possible to combine a plurality of functionalities, such as, for example, colouring and UV filter, with one another in particles of one type.

A further essential constituent of the particles according to the invention are the one or more layers of one or more silanes. Suitable silanes are organosilanes of the general formula

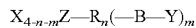

where X=OH, halogen, alkoxy or aryloxy
Z=Si
R=alkyl, phenyl or hydrogen
B=organic, at least bifunctional group (alkylene or alkyleneoxyalkylene)
Y=alkyl, amino, substituted amino, hydroxyl, hydroxyalkyl, siloxane, acetoxy, isocyanate, vinyl, acryloyl, epoxide, epoxypropyloxy, imidazole or ureido group
n and m=0, 1, 2 or 3, where n+m<3.

The organosilanes consist of an anchor group ($X_{4-n-m}Z$), which is able to bond, for example, to the surface of the substrate, at least one hydrophobic group (R or B) and one or more alkyl or functional groups (Y). The anchor group preferably consists of alkoxysilanes, which can be converted by hydrolytic reaction conditions into corresponding hydroxyl groups. The latter can, in the case of the embodiment according to the invention in which firstly a silane layer and subsequently a polymer layer are applied to the substrate, bond, for example, to a calcined metal-oxide surface of the substrate and effect anchoring via oxygen bridges.

The organosilane can be matched to the requirements through the choice of suitable functional groups. In addition, additional bonds between particles and medium can be produced via the organosilane, depending on the coating sequence, through reaction of the functional groups with corresponding functionalities in the application media. In a particular embodiment, the surface of the particles according to the invention is modified by means of a combination of organic functionalities which is matched to the use medium. Also suitable for this purpose is the use of mixtures of different organosilanes. The hydrophobicity of the particle surface can likewise be adapted by integration of alkyl-containing coupling reagents, such as, for example, alkylsilanes. Besides organosilanes, preference is also given to the use of hydrolysates thereof and homogeneous and heterogeneous oligomers and/or polymers thereof, which can likewise be employed alone or in combination with the silanes described above. Particular preference is given to mixtures of different organosilanes, in particular containing functional groups Y which are different from one another, the use of which ensures a particular application latitude.

Examples of organosilanes are propyltrimethoxysilane, propyltriethoxysilane, isobutyltrimethoxysilane, n-octyltrimethoxysilane, i-octyltrimethoxysilane, n-octyltriethoxysilane, n-decyltrimethoxysilane, dodecyltrimethoxysilane, hexadecyltrimethoxysilane, vinyltrimethoxysilane and octadecyltrimethoxysilane, preferably vinyltrimethoxysilane. Suitable oligomeric, alcohol-free organosilane hydrolysates are, inter alia, the products marketed by Sivento under the trade name "Dynasylan®", such as, for example, Dynasylan HS 2926, Dynasylan HS 2909, Dynasylan HS2907, Dynasylan HS 2781, Dynasylan HS 2776 and Dynasylan HS 2627. In addition, oligomeric vinylsilane and also aminosilane hydrolysate are suitable as organic coating. Functionalised organosilanes are, for example, 3-amino-propyltrimethoxysilane, 3-methacryloxytrimethoxysilane, 3-glycidyloxy-propyltrimethoxysilane, beta-(3,4-epoxycyclohexyl)ethyltrimethoxysilane, gamma-isocyanatopropyltrimethoxysilane, 1,3-bis(3-glycidoxypropyl)-1,1,3,3-tetramethyldisiloxane, ureidopropyltriethoxysilane, preferably 3-aminopropyltrimethoxysilane, 3-methacryloxytrimethoxysilane, 3-glycidyl-oxypropyltrimethoxysilane, beta-(3,4-epoxycyclohexyl)ethyltrimethoxysilane and gamma-isocyanatopropyltrimethoxysilane. Examples of polymeric silane systems are described in WO 98/13426 and marketed, for example, by Sivento under the trade name Hydrosil®.

The present invention furthermore relates to a process for the production of the particles according to the invention in which substrates are coated with one or more layers of one or more polymers and one or more layers of one or more silanes.

The coating with one or more layers of one or more polymers is preferably carried out by precipitation in water and/or organic solvents, by polycondensation reactions, by polyaddition reactions and/or by free-radical polymerisation. Particular preference is given to precipitation of the polymers, i.e. the use of polymer precipitation processes. Preferred polymer precipitation processes for the surface modification of particles which may be mentioned here are lower critical solution temperature, upper critical solution temperature and solvolysis technology. These processes have the advantage that firstly they are simple in process engineering terms and secondly are insensitive with respect to the nature and functionality of the surface. These processes are distinguished by simplicity of application since they start from prefabricated polymers. A multilayered structure having a plurality of alternating silane and polymer layers only becomes practicable at all thereby, which becomes more difficult with each new layer in precipitation polymerisations and grafting-from methods as a consequence of the complexity. The amounts of unconsumed monomers, which represent an extremely undesired impurity since they are chemically active and additionally can have an adverse effect on physical parameters, such as the hardness and elasticity of a polymer matrix, formed in the last-mentioned processes can likewise be reduced.

In a preferred embodiment of the process according to the invention, the substrate is mixed with an LCST and/or UCST polymer or polymers containing solvolysable groups or a polymer mixture, optionally in the presence of a solvent. The LCST polymer is dissolved at a temperature below the LCST, while the UCST polymer is dissolved at a temperature above the UCST. In general, the LCST temperature is from 0.5 to 90° C., preferably from 35 to 80° C., while the UCST temperature is from 5 to 90° C., in particular from 35 to 60° C. Any additives are then added. The temperature is subsequently increased above the LCST or lowered below the UCST, generally by about 5° C., during which the polymer precipitates and deposits on the particle surface. Finally, immobilisation is carried out in the form of crosslinking of the polymer on the particle surface, during which the polymer is irreversibly fixed to the particle surface. The immobilisation can be carried out by means of free radicals, cationically, anionically or by condensation reactions. The LCST or UCST polymers are preferably crosslinked by means of free radicals or by condensation reactions.

For free-radical crosslinking (immobilisation) of the deposited layer in water, use is preferably made of potassium peroxodisulfate or ammonium peroxodisulfate in concentration ranges of from 1 to 100% by weight, based on the olefinic LCST or UCST polymer used for the coating. The crosslinking is carried out, depending on the LCST or UCST temperature of the polymer, at from 0 to 35° C. using a catalyst, such as, for example, an Fe(II) salt, or at from 40 to 100° C. by direct thermal decomposition of the free-radical initiator.

The thickness of the polymer layers is usually in the range from 2 to 500 nm, preferably from 5 to 300 nm and in particular from 5 to 200 nm.

If a solvent is required in the process according to the invention, the choice of solvent depends on the solubility of the polymer used. The solvent is preferably water or a water-miscible organic solvent. Water-miscible solvents also include solvents which have miscibility gaps with water. In these cases, the mixing ratios are selected in such a way that miscibility occurs. Examples of suitable solvents are monohydric and polyhydric alcohols, such as, for example, methanol, ethanol, n-propanol, isopropanol, glycol, glycerol, propylene glycol, polyethylene glycol, polybutylene glycol and the mono- and diethers of polyalkylene glycols with methanol, ethanol, propanol and butanol, additionally ethers, such as, for example, tetrahydrofuran, dioxane, 1,2-propanediol propyl ether, 1,2-butane 1-methyl ether, ethylene glycol monomethyl ether, diethylene glycol monomethyl ether. Also suitable are esters, such as, for example, methyl acetate, monoesters of ethylene glycol or propylene glycol with acetic acid, butyrolactone, but also ketones, such as, for example, acetone or methyl ethyl ketone, or amides, such as, for example, formamide, dimethylformamide, dimethylacetamide, N-methyl-pyrrolidone and hexamethylphosphoric triamide, or sulfoxides and sulfones, such as dimethyl sulfoxide and sulfolane, and alkanecarboxylic acids, such as formic acid or acetic acid. Preferred solvents are water and alcohols or glycols.

The one or more silanes are preferably applied by precipitation in solution at temperatures above 60° C., preferably above 70° C. Processes of this type are known to the person skilled in the art and are described, for example, in WO 98/13426, EP 0 416 395, EP 0 679 700, EP 0 634 459 or EP 0 268 918, the disclosure content of which is incorporated herein by way of reference. Suitable solvents are organic solvents, water or mixtures thereof, use preferably being made of water. The reaction time necessary for application of the organic coating is at least 5 minutes; it preferably takes place over a period of from 10 to 90 minutes, but can also be extended as desired. The particles obtained are worked up and isolated by methods which are customary to the person skilled in the art, for example by filtration, drying and sieving.

The present invention furthermore relates to the use of the particles according to the invention in surface coatings, water-borne coatings, powder coatings, paints, printing inks, toners, safety elements, plastics, concrete, in cosmetic formulations, in agricultural sheeting and tent awnings and for the preparation of pigment compositions and dry preparations.

In the case of cosmetics, the particles according to the invention are particularly suitable for products and formulations in decorative cosmetics, such as, for example, nail varnishes, colouring powders, lipsticks or eye-shadows, soaps, toothpastes etc. The particles according to the invention can of course also be combined in the formulations with cosmetic raw materials and assistants of all types. These include, inter alia, oils, fats, waxes, film formers, preservatives and assistants which generally determine applicational properties, such as, for example, thickeners and rheological additives, such as, for example, bentonites, hectorites, silicon dioxide, Ca silicates, gelatine, high-molecular-weight carbohydrates and/or surface-active assistants, etc. The formulations comprising particles according to the invention can belong to the lipophilic, hydrophilic or hydrophobic type. In heterogeneous formulations with discrete aqueous and non-aqueous phases, the particles according to the invention may be present in only one of the two phases in each case or alternatively distributed over both phases.

The pH values of the aqueous formulations can be between 1 and 14, preferably between 2 and 11 and particularly preferably between 5 and 8. The concentrations of the particles according to the invention in the formulation are not subject to any limits. They can be—depending on the application—between 0.001 (rinse-off products, for example shower gels) and 100% (for example lustre-effect articles for particular applications on use of effect pigments as substrate). The particles according to the invention may furthermore also be combined with cosmetic active ingredients.

Suitable active ingredients are, for example, insect repellents, UV A/BC protection filters (for example OMC, B3 and MBC), anti-ageing active ingredients, vitamins and derivatives thereof (for example vitamin A, C, E, etc.), self-tanning agents (for example DHA, erythrolose, inter alia) and further cosmetic active ingredients, such as, for example, bisabolol, LPO, ectoin, emblica, allantoin, bioflavonoids and derivatives thereof.

On use of the particles in paints and surface coatings, all areas of application known to the person skilled in the art are possible, such as, for example, powder coatings, automobile paints, printing inks for gravure, offset, screen or flexographic printing and surface coatings in outdoor applications. For the production of printing inks, a multiplicity of binders, in particular water-soluble grades, is suitable, for example based on acrylates, methacrylates, polyesters, polyurethanes, nitrocellulose, ethylcellulose, polyamide, polyvinyl butyrate, phenolic resins, maleic resins, starch or polyvinyl alcohol. The paints can be water- or solvent-based paints, the choice of paint constituents being part of the general knowledge of the person skilled in the art.

In addition, the particles according to the invention can be used in films and plastics, for example in agricultural sheeting, infrared-reflective films and panes, gift foils, plastic containers and mouldings for all applications known to the person skilled in the art. Suitable plastics are all common plastics for the incorporation of the particles according to the invention, for example thermosets or thermoplastics. The description of the possible applications and plastics which can be employed, processing methods and additives are given, for example, in RD 472005 or in R. Glausch, M. Kieser, R. Maisch, G. Pfaff, J. Weitzel, Perlglanzpigmente [Pearlescent Pigments], Curt R. Vincentz Verlag, 1996, 83 ff., the disclosure content of which is incorporated herein.

It has proven advantageous, for example, in the case of flake-form effect pigments as particles for use in liquid coating systems in the present invention, firstly to coat these pigments with a silane layer which functions as water-barrier layer and then with a polymer layer, where the polymer layer takes on the role of stabilisation of the particles, mechanical stabilisation and interaction with the matrix, preferably a binder matrix. An important criterion for assessment of the particles according to the invention is the change in their properties on incorporation into coating materials. A criterion used for investigation here is the DOI (distinctness of image), which describes the sharpness of the side edges of an image reflected at a surface of an object. In particular in the case of effect pigments, the highest possible degree of DOI is desirable in order to achieve a high degree of reflectivity and lustre. The particles coated in accordance with the present invention, for example effect pigments, have, if incorporated into surface-coating systems, a high initial DOI value and a small drop in DOI on exposure to water, for example in the course of a condensation test. Flocculation in the surface-coating medium and aggregation during the drying process are suppressed to an extremely great extent, and wetting is greatly improved by the outer polymer layer. In general, these particles exhibit more universal applicability in a very wide variety of polymer matrix systems.

For use in systems subjected to relatively high mechanical stress, the corresponding polymer layer must be matched in thickness to the silane layer. A certain incompatibility with the surface-coating matrix is often desired, for example on use in powder-coating systems, in order, for example, to produce so-called leafing effects (the floating of pigments on the surface on incorporation into a binder matrix). It may be advantageous here to carry out the layer sequence in the reverse manner. A corresponding layer sequence often also proves to be more thermally resistant, thus also facilitating thermally demanding applications of these particles in plastics. A thick polymer layer also reduces, for example, separation during powder-coating application, and consequently the particles according to the invention are preferably employed in powder coatings, liquid coating systems, plastics and in systems with large input of mechanical energy, where the layer sequence and composition as well as the thickness of the individual layers can be matched specifically to the requirements.

In the above-mentioned areas of application, the particles according to the invention having a multilayered structure are suitable both for use in mixtures with organic dyes and/or pigments, such as, for example, transparent and opaque white, coloured and black pigments as well as with flake-form iron oxides, organic pigments, holographic pigments, LCPs (liquid crystal polymers) and conventional transparent, coloured and black lustre pigments based on metal oxide-coated flakes based on mica, glass, $Al_2O_3$, $Fe_2O_3$, $SiO_2$, etc. The particles according to the invention can be mixed with commercially available pigments and fillers in any ratio.

Fillers which may be mentioned are, for example, natural and synthetic mica, nylon powder, pure or filled melanine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be, for example, flake-form, spherical or needle-shaped in accordance with requirements.

The particles according to the invention are furthermore suitable for the preparation of flowable pigment compositions and dry preparations comprising one or more particles according to the invention, binders and optionally one or more additives. The term dry preparations is also taken to mean preparations which comprise from 0 to 8% by weight, preferably from 2 to 8% by weight, in particular from 3 to 6% by weight, of water and/or a solvent or solvent mixture. The dry preparations are preferably in the form of pellets, granules, chips, sausages or briquettes and have particle sizes of 0.2-80 mm. The dry preparations are used, in particular, in the production of printing inks and in cosmetic formulations.

Owing to the broad range of applications, the present invention likewise relates to surface coatings, water-borne coatings, powder coatings, paints, printing inks, toners, safety elements, plastics, concrete, cosmetic formulations, agricultural sheeting, tarpaulins, pigment compositions and dry preparations comprising particles having a multilayered structure in accordance with the present invention.

The following examples are intended to explain the invention in greater detail, but without restricting it.

EXAMPLES

Example 1

100 g of Iriodin® 225 are warmed to 75° C. with stirring in 600 ml of distilled water. 1 g of aminopropyltrimethoxysilane and then 1 g of vinyltrimethoxysilane are slowly added dropwise. After stirring at 75° C. for 30 minutes, the pigment is filtered off and washed. The pigment is again taken up in 300 ml of water, 1.5% of an olefin-functionalised polypropylene oxide are added dropwise at 20° C., the mixture is warmed to 66° C., 1 g of potassium peroxodisulfate is added, and the mixture is crosslinked by means of free radicals by stirring at this temperature for a further 60 minutes. The post-coated pigment is filtered off, washed with water and dried at 130° C. in a fan-assisted oven. On incorporation into conventional surface-coating systems and water-borne coating systems, the pigment generally has both a high initial value for the DOI and a small drop in the DOI. It is essential that this pigment can be employed universally in a very wide variety of surface-coating systems so that the advantages described occur virtually independently of the surface-coating system. Compared with silane-coated effect pigments, this pigment furthermore has increased mechanical stability to shear stresses.

Example 2

100 g of Iriodin® 103 are stirred at room temperature in 300 ml of distilled water containing 3 g of an amino-functionalised polypropylene oxide (LCST temperature 40° C.). The mixture is warmed to 45° C. and stirred at this temperature for 15 minutes. After further warming at 75° C., a further 300 ml of distilled water are added. After slow addition of 0.5 g of aminopropyltrimethoxysilane, 1.5 g of vinyltrimethoxysilane are likewise slowly added dropwise. After stirring at 75° C. for 45 minutes, the post-coated effect pigment is filtered off, washed and dried at 130° C. in a fan-assisted oven. Owing to its relatively thick polymer layer, this pigment is suitable for systems with increased input of mechanical energy, i.e. also for powder-coating applications, since it exhibits excellent leafing properties and low separation properties on application in many powder-coating systems owing to its hydrophobic surface. Owing to the thermally stable silane coating as the outermost layer, it can also successfully be employed in plastics with high thermal stress.

The invention claimed is:

1. Particles having a multilayered structure consisting of substrates coated with a layer of one or more polymers and a layer of one or more silanes applied thereto, or substrates coated with a layer of one or more silanes and a layer of one or more polymers applied thereto, and optionally additives which are nanoparticles, plasticizers, antioxidants, free-radical scavengers, UV filters, dyes, microtitanium or mixtures thereof, wherein the substrate is selected from the group consisting of $SiO_2$ particles, $TiO_2$ particles, holographic pigments, pearlescent pigments, interference pigments, multilayered pigments and/or BiOCl pigments.

2. Particles having a multilayered structure comprising substrates coated with a layer of one or more polymers and a layer of one or more silanes applied thereto, wherein the substrate is selected from the group consisting of $SiO_2$ particles, $TiO_2$ particles, holographic pigments, pearlescent pigments, interference pigments, multilayered pigments and/or BiOCl pigments.

3. Particles according to claim 1, wherein the holographic pigments, pearlescent pigments, interference pigments, and/or multilayered pigments are based on supports of natural or synthetic mica, $Al_2O_3$ flakes, $TiO_2$ flakes, $SiO_2$ flakes, $Fe_2O_3$ flakes, glass flakes, ceramic flakes, or graphite flakes.

4. Particles according to claim 1 wherein the one or more polymers are selected from the group consisting of polyethers, polyacrylates, polyvinylcaprolactams, cellulose, polystyrenes, polyvinyl alcohols, polyvinyl acetates, polysiloxanes, derivatives of the said polymers or mixtures thereof.

5. Particles according to claim 1 wherein the polymers are LCST and/or UCST polymers or polymers containing solvolysable groups.

6. Particles according to claim 1 wherein the one or more silanes are selected from the group consisting of the organosilanes having the general formula

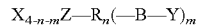

where X=OH, halogen, alkoxy or aryloxy

Z=Si

R=alkyl, phenyl or hydrogen

B=organic, at least bifunctional group (alkylene, alkyleneoxyalkylene)

Y=alkyl, amino, substituted amino, hydroxyl, hydroxyalkyl, siloxane, acetoxy, isocyanate, vinyl, acryloyl, epoxide, epoxypropyloxy, imidazole or ureido group n and m 0, 1, 2 or 3, where n+m≦3.

7. Process for the production of particles having a multilayered structure according to claim 1, wherein substrates are coated with alternating layers of one or more polymers and one or more layers of one or more silanes.

8. Process according to claim 7, wherein the coating with one or more polymers is carried out by precipitation in water and/or organic solvents, by polycondensation reactions, by polyaddition reactions and/or by free-radical polymerisation.

9. Process according to claim 7 wherein the polymers are LCST and/or UCST polymers or polymers containing solvolysable groups.

10. Process according to claim 7 wherein the silanes are applied by precipitation in water and/or organic solvents.

11. Surface coatings, water-borne coatings, powder coatings, paints, printing inks, toners, safety elements, plastics, concrete, cosmetic formulations, agricultural sheeting, tarpaulins, tent awnings, pigment compositions and dry preparations comprising particles having a multilayered structure according to claim 1.

* * * * *